United States Patent [19]

Giroux et al.

[11] Patent Number: 5,088,519
[45] Date of Patent: Feb. 18, 1992

[54] DEVICE FOR CONNECTING TWO CONDUIT PARTS

[75] Inventors: Patrice Giroux, Saint Egreve; Jean-Christophe Rey, Echirolles, both of France

[73] Assignee: Sames S.A., Meylan, France

[21] Appl. No.: 537,802

[22] Filed: Jun. 14, 1990

[30] Foreign Application Priority Data

Jun. 16, 1989 [FR] France .................. 89 08026

[51] Int. Cl.⁵ ............ B08B 9/02; B08B 3/04; F16K 1/44
[52] U.S. Cl. ............... 137/240; 134/166 C; 137/614.01; 137/614.17; 137/614.18
[58] Field of Search ......... 137/240, 614, 614.01, 137/614.16, 614.17, 614.18, 614.19; 251/149.1, 149.6, 149.8; 134/166 C, 167 C, 168 C, 169 C, 172

[56] References Cited

U.S. PATENT DOCUMENTS

| | | | |
|---|---|---|---|
| 3,583,426 | 6/1971 | Feres | 137/240 |
| 4,144,901 | 3/1979 | Stevenson | 137/240 |
| 4,304,251 | 12/1981 | Schädel et al. | 137/614.19 |
| 4,313,475 | 2/1982 | Wiggins | |
| 4,373,545 | 2/1983 | Knappe | 137/614.17 |
| 4,429,713 | 2/1984 | Walter | 251/149.8 |
| 4,458,543 | 7/1984 | Mieth | 137/240 |
| 4,617,955 | 10/1986 | Melgaard | 137/614.19 |
| 4,687,015 | 8/1987 | Mieth | 137/238 |
| 4,825,893 | 5/1989 | Gailey | 251/149.6 |

FOREIGN PATENT DOCUMENTS 3228157 2/1984 Fed. Rep. of Germany .
7829498 10/1978 France .

*Primary Examiner*—George L. Walton
*Attorney, Agent, or Firm*—Spensley Horn Jubas & Lubitz

[57] ABSTRACT

A device for connecting two conduit parts, in particular two parts of a pollutant fluid circuit, comprises a first connector part enclosing a first valve member elastically urged towards a first valve seat to isolate a fluid outlet. A second connector part comprises a tubular element defining an inlet conduit and enclosing a second valve member elastically urged towards a second valve seat to isolate a fluid inlet. A system is provided for cleaning contacting surfaces of the two connector parts and in particular those of the two valve members. The valve members have respective complementary shape mutually contacting surfaces and are adapted to be movable conjointly while remaining in contact so as to enable the fluid to pass.

10 Claims, 1 Drawing Sheet

DEVICE FOR CONNECTING TWO CONDUIT PARTS

BACKGROUND OF THE INVENTION

1. Field of the Invention

The invention concerns a device for connecting two conduit parts; it is more particularly directed to an improvement for avoiding any pollution of the external medium when the two elements of the device are separated, while preventing entry of air into the circuit.

2. Description of the Prior Art

In an installation for applying paint connecting devices are frequently used between parts of a paint distribution circuit. To limit pollution of the environment it is desirable to avoid any flow of paint during each disconnection operation. It is also necessary to prevent any dried paint near the connecting orifice preventing correct functioning of the device. Finally, the coupling mechanism must be designed to prevent any entry of air into the circuit. U.S. Pat. No. 4,313,475 describes a connecting device in which a fluid outlet valve opens a non-return valve facing it and enabling entry of a fluid. This document does not disclose any means of cleaning the parts soiled on decoupling.

SUMMARY OF THE INVENTION

The invention concerns a device for connecting two conduit parts, in particular two parts of a pollutant fluid circuit, comprising:
- a first connector part enclosing a first valve member elastically urged towards a first valve seat to isolate a fluid outlet,
- a second connector part comprising a tubular element defining an inlet conduit and enclosing a second valve member elastically urged towards a second valve seat to isolate a fluid inlet, and
- means for cleaning contacting surfaces of the two connector parts and in particular those of the two valve members, in which device the valve members have respective complementary shape mutually contacting surfaces and are adapted to be movable conjointly while remaining in contact so as to enable said fluid to pass.

The invention will be better understood and other advantages of the invention will emerge more clearly from the following description of a device in accordance with the invention given by way of example only and with reference to the appended diagrammatic drawings.

DETAILED DESCRIPTION OF THE INVENTION

Figure 1:
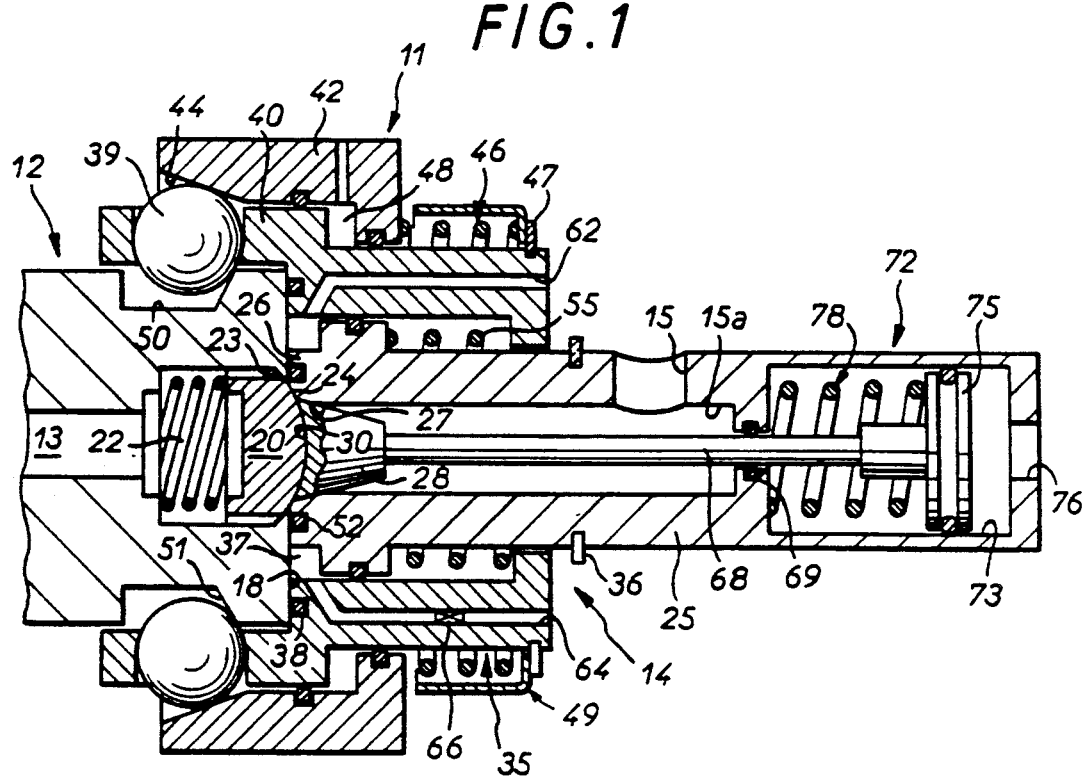
FIG. 1 is a longitudinal view of the connecting device in cross-section on the line I—I in FIG. 2.
Figure 2:
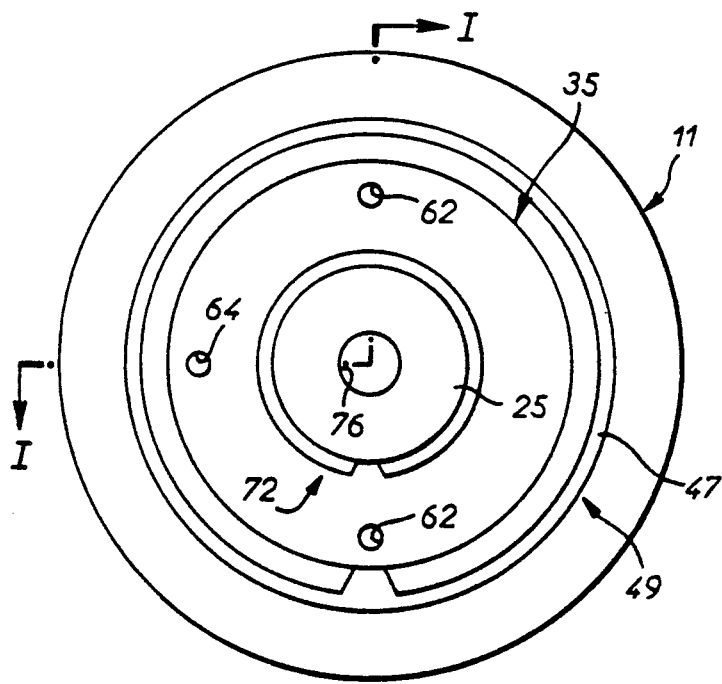
FIG. 2 is a righthand side view of FIG. 1.

The drawings show a device 11 for connecting two conduit parts and essentially comprising two separable sub-assemblies, namely a first connector part 12 in which is defined a fluid outlet 13 and a second connector part 14 in which is defined an inlet 15 for the same fluid. This fluid is conventionally paint or varnish. The first connector part may be carried by the end of a robot arm and the second connector part, fixed to a wall of a spray booth, is connected to be supplied by a fluid distribution conduit. The two connector parts may be assembled together end-to-end along a common axial direction, as shown. The connector part 12 has an end 18 in the form of a transverse annular wall at the center of which is a first valve member 20 movable axially inside a cavity communicating with the outlet 13; this valve member is urged by a spring 22 towards a valve seat 23 to isolate the outlet 13. The valve member has a convex surface 24 which is part of a spherical dome. When the valve member is applied against its valve seat this convex surface projects slightly beyond the wall constituting the end 18.

The connector part 14 comprises a tubular element 25 within which is defined an axial inlet conduit 15a in communication with the inlet 15. One end opens onto a transverse surface 26 designed to be pressed against the surface of the end 18. It comprises a frustoconical part forming the valve seat 27 for a second valve member 28, this arrangement being used to isolate the inlet 15. The second valve member 28 is of generally frustoconical shape and has a concave end surface 30 which is part of a spherical dome and is applied against the surface 24 of the valve member 20. The two spherical domes are preferably of the same radius so that there is virtually no air space between the two valve members when brought together. However, to ensure that each valve closes effectively a very small space may be left between their opposed surfaces. In other words, the two valve members are provided with respective mutual contacting surfaces of complementary shape. They are arranged so as to be movable together while remaining in contact to enable the fluid to flow from the inlet 15 to the outlet 13. To this end the outside diameter of the valve member 28 is slightly smaller than the diameter of the orifice in the valve seat 23 for the first valve member so that, when the valve member 28 is pushed away from it valve seat 27, it also separates the valve member 20 from its valve seat 23, enabling the fluid to flow between the inlet 15 and the outlet 13.

The connector part 14 also comprises means for cleaning the two valve members and, more generally, all of the interface where the two connector parts connect.

In the examples described these cleaning means comprise a coaxial element 35 mounted outside the tubular element 25. These two elements are able to slide axially relative to each other. This sliding is limited by a circlip 36 fixed to the element 25. Said coaxial element 35 is adapted to be applied to and fixed against the end 18 of said first connector part 12 and to be fixed to it. The coaxial element 35 therefore forms a kind of sliding bush while the tubular element 25 comprises at its end an external shoulder defining with said coaxial element 35 and the end 18 of the first connector part an annular cleaning fluid injection chamber 37. The walls of this chamber 37 are advantageously treated to prevent adhesion of the fluids employed, for example they are covered with polytetrafluorethylene. The cleaning fluid in question is at least a rinsing liquid appropriate to the nature of the product and preferably also compressed air injected after rinsing. A seal 38 prevents any leakage to the external environment.

The mechanical connection of the two connector parts is provided by balls 39 inserted into corresponding holes in a cylindrical skirt 40 of the coaxial element 35. Outside the latter is a tubular locking element 42 sliding on the coaxial element and comprising a shallow ramp surface 44 for holding the balls in their holes. The locking element is urged towards the balls by a spring 46 compressed between the locking element and a circlip 47 fastened to the coaxial element 35. An actuation chamber 48 is defined between the elements 35 and 42. Compressed air is injected into it to unlock the balls. A shouldered bush 49 limits the travel of the element 42 due to the effect of the compressed air. It surrounds the spring 46 and bears on the circlip 47. When the two connector parts are connected together the balls are held by the locking element in an external annular groove 50 on the connector part 12 which has an inclined flank 51. This applies the transverse surface 26 against the end 18 of the first connector part, an annular gasket 52 being provided between these two surfaces. Also, a spring 55 is mounted between respective shoulders on the coaxial element 35 and the tubular element 25. This spring tends to push the tubular element 25 axially out of the coaxial element 35. In this way when said coaxial element is locked to said first connector part 12 the end of the tubular element 25 is applied by the force of the spring 55 against the end 18. The annular chamber 37 is therefore defined and delimited when the two connector parts are connected together.

The coaxial element 35 includes at least one cleaning fluid (rinsing liquid and/or drying air) inlet 62 and a cleaning fluid outlet 64. There are preferably two inlet conduits such as 62 and an outlet circuit, the two inlet conduits discharging into the chamber 37 at opposite sides thereof so as to establish turbulent flow for effective cleaning of the walls. The conduits 62 and 64 discharge onto the internal surface of the coaxial element 35 at locations whereby they can communicate with said annular chamber 37. The cleaning fluid outlet conduit 64 incorporates a calibrated flow restriction 66.

The second valve member 28 is fastened to a rod 68 which passes axially through a wall 69 separating said inlet conduit 15a from a piston-and-cylinder actuator 72 disposed in a cylindrical cavity 73 of said second connector part. The rod 68 is fixed to the piston 75 of this actuator. A control fluid can be injected through an orifice 76 into one chamber of the actuator to urge the piston in the direction tending to separate the valve member 28 from its valve seat 27. A spring 78 is mounted in said cavity between one of its axial ends and the piston so as to urge said second valve member 28 towards the closed position, that is to say against the valve seat 27.

Operation is as follows:

At all times during operation paint is held under pressure in the inlet conduit 15a and in the conduit connected to the outlet 13, the pressure at the outlet 13 being of course less than that in the inlet conduit 15a. When the two connector parts 12 and 14 are separated the two valve members oppose any egress of fluid, the spring 78 in particular developing sufficient force to hold the valve member 28 against its valve seat 27.

The chamber 48 being pressurized to release the balls 39, the two connector parts 12 and 14 are moved towards each other. The effect of the coupling is initially to apply the gasket 52 against the end 18 and then to apply the valve member 20 against the valve member 28 and the surface 26 against the end 18 of the connector part 12. The compression of the spring 55 at the end of the coupling travel enables the face 18 of the connector part 12 to come into contact with the gasket 38. Depressurization of the chamber 48 enables the spring 46 to press the coaxial element 35 against the end 18 of the connection part 12, by virtue of the conjugate action of the ramp surface 44, the balls 39 and the inclined flank 51 of the groove 50. The annular chamber 37 is then defined.

If a control pressure is applied to the actuator 72 via the orifice 76 or if the pressure of the fluid in the conduit 15a reaches a sufficient predetermined value the valve member 28 is separated from its valve seat 27 and pushes back the valve member 20. The fluid can then flow from the inlet 15 to the outlet 13.

To separate the two parts it is sufficient to eliminate the control pressure in the actuator 72 and/or to reduce the pressure of the fluid itself at the inlet 15. The two valve members 28 and 20 again bear on their respective valve seats 27 and 23. The flow of fluid stops.

A rinsing fluid consisting for example of a mixture of an appropriate liquid and compressed air is then introduced via the conduit 62 as far as the chamber 37; it is evacuated via the conduit 64. Because of the pressure drop at the flow restriction 66 the pressure of the rinsing fluid in the chamber 37 is sufficient to overcome the action of the spring 55 and to cause retraction of the tubular element 25 relative to the coaxial element 35. The rinsing fluid can therefore clean all of the connecting surface between the connector parts 12 and 14. After the rinsing proper compressed air is injected in the same way into the chamber 37 which maintains or brings about the retraction of the tubular element 25 and therefore the drying of the connecting surface. When drying is completed the chamber 37 is depressurized and the two connector parts return to contact with each other. They can then be disconnected from each other, the ball system being unlocked by injecting compressed air into the actuation chamber 48. Note that the pressure of the rinsing liquid or of the drying air is predetermined to separate the two surfaces to be cleaned without affecting the sealing action of the two valve members, in particular that of the valve member 20 held against its valve seat by the spring 22.

We claim:

1. A device for connecting two conduit parts, in particular two parts of a pollutant fluid circuit, comprising:
    a first connector part enclosing a first valve member elastically urged towards a first valve seat to isolated a fluid outlet,
    a second connector part comprising a tubular element defining an inlet conduit and enclosing a second valve member elastically urged towards a second valve seat to isolate a fluid inlet, and
    means for cleaning contacting surfaces of the two connector parts and in particular those of the two valve members, in which device the valve members have respective complementary shape mutually contacting surfaces and are adapted to be movable conjointly while remaining in contact so as to enable said fluid to pass, wherein said cleaning means include a coaxial element and said tubular element are able to slide coaxially relative to each other, said coaxial element being adapted to be applied against one end of said first connector part at which said first valve member is disposed, said coaxial element, said tubular element and said one end together defining, when said connector parts are connected together, an annular chamber for injecting cleaning fluid and/or drying air.

2. Device according to claim 1 comprising respective shoulders on said tubular element and said coaxial element and a spring mounted between said shoulders.

3. Device according to claim 2 wherein said coaxial element includes at least one cleaning fluid inlet conduit and at least one cleaning fluid outlet conduit, said inlet and outlet conduits discharging at locations whereby they can communicate with said annular chamber.

4. Device according to claim 3 including two cleaning fluid inlet conduits.

5. Device according to claim 4 wherein said two cleaning fluid inlet conduits discharge into said annular chamber at diametrally opposite points.

6. Device according to claim 3 wherein said at least one cleaning fluid outlet conduit incorporates a calibrated flow restrictor.

7. Device according to claim 6 wherein the fluid pressure in said annular chamber is adapted to separate the surfaces to be cleaned without affecting the sealing effect of said valves.

8. Device according to claim 1 wherein the mutually facing parts of said connector parts have substantially complementary shapes so that no air is trapped between them during coupling.

9. Device according to claim 1 wherein at least the walls of said annular chamber are treated to prevent the fluid adhering to them.

10. A device for connecting two conduit parts, comprising:
   a first connector part having a first end surface, a first fluid passage extending to said first end surface and a first valve seat bordering said first fluid passage adjacent said first end surface;
   a first valve member elastically urged toward said first valve seat to block said first fluid passage;
   a second connector part having a second end surface, a second fluid passage extending to said second end surface and a second valve seat bordering said second fluid passage adjacent said second end surface;
   a second valve member elastically urged toward said second valve seat to block said second fluid passage;
   said first and second valve members having respective end faces and said first and second connector parts being releasably couplable together so that said first and second end surfaces face one another, said end faces face on another and a sealed joint is created between said first and second end surfaces; and
   means for cleaning said first and second end surfaces and said end faces while each said fluid passage is blocked by its respective valve member, said cleaning means comprising sealing means forming a sealed chamber enclosing said end faces of said valve members, and means for separating said first and second end surfaces from one another and said valve member end faces from one another and producing a flow of cleaning fluid across said first and second end surfaces and said end faces while said valve members continue to block their respective fluid passages.

* * * * *